No. 895,845. PATENTED AUG. 11, 1908.
H. W. COMSTOCK.
SALT HOLDER.
APPLICATION FILED NOV. 12, 1907.
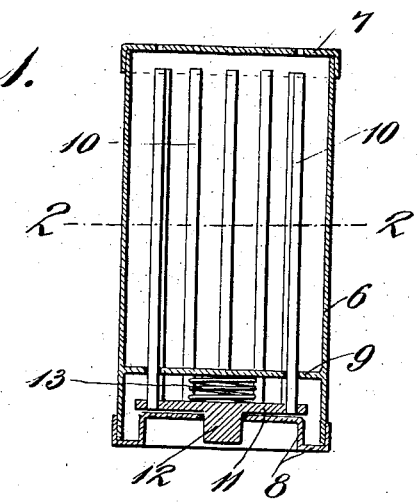
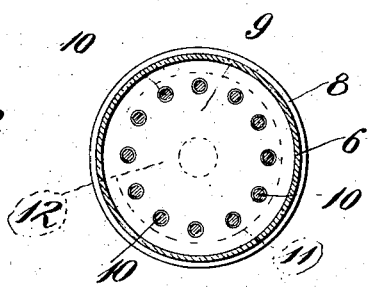
Henry W. Comstock,
Inventor
Witnesses
By Milo B. Stevens & Co.
Attorneys

UNITED STATES PATENT OFFICE.

HENRY W. COMSTOCK, OF CHICAGO, ILLINOIS.

SALT-HOLDER.

No. 895,845.  Specification of Letters Patent.  Patented Aug. 11, 1908.

Application filed November 12, 1907. Serial No. 401,850.

*To all whom it may concern:*

Be it known that I, HENRY W. COMSTOCK, citizen of the United States, residing at Chicago, in the county of Cook and State of Illinois, have invented certain new and useful Improvements in Salt-Holders, of which the following is a specification.

This invention is a holder for salt, pepper or other condiments, and has for its object to provide improved means for disintegrating or stirring up the material so that it will not clog at the holes in the cover.

The invention is illustrated in the accompanying drawings, in which

Figure 1 is a vertical section of the holder. Fig. 2 is a horizontal section on the line 2—2 of Fig. 1.

The outer box or casing consists of a cylinder 6 having a perforated cover 7 and a bottom 8, the central part of the bottom being raised, as shown. Within the casing thus formed is a false bottom 9 having perforations through which work a set of rods or fingers 10 which are fastened at the lower ends to a plate 11 which has a depending stud or finger piece 12 which projects through a hole in the raised portion of the bottom 8. A coiled spring 13 is placed between the false bottom 9 and the plate 11, and is held in its place by the rods 10, and acts to press down the plate and retract the fingers.

The salt or other material is placed in the upper part of the box. By pressing on the pin 12 the fingers 10 are caused to advance and retract, and repeated movements will serve to dislodge any accumulations in the holes in the cover 7 and force salt from the holes, whether damp or dry. When the fingers 10 are advanced the ends thereof strike over the holes in the cover 7, and so serve to jar the cover and knock out any accumulations in said holes. The fingers will also break up any cakes or lumps formed within the box. The bottom 8 is raised at the center, in order that room may exist for the pin 12. In the act of use the box will be inverted and the pin 12 pressed rapidly several times, to shake the material from the box.

I claim:

A condiment holder comprising a box having upper and lower bottoms, a plate located between said bottoms and having a set of fingers projecting through said upper bottom and movable to and from the top of the box, a pin connected to said plate to advance the fingers, and extending through the lower bottom, and a spring between the plate and the said upper bottom to retract the fingers.

In testimony whereof I affix my signature, in presence of two witnesses.

HENRY W. COMSTOCK.

Witnesses:
 NELLIE FELTSKOG,
 H. G. BATCHELOR.